United States Patent [19]
Adams et al.

[11] Patent Number: 5,649,756
[45] Date of Patent: Jul. 22, 1997

[54] REARVIEW MIRROR WITH LIGHTING ASSEMBLY

[75] Inventors: Edward R. Adams, Spring Lake; Anton C. Bastiaanse, Holland; Ricky L. Berens, Holland; Howard W. Fant, Jr., Grand Haven; Barry W. Hutzel; William P. Lantz, both of Holland; Craig M. Miller, Jenison; Troy L. VanderHoof, Holland; Paul C. Belding, Charlevoix, all of Mich.

[73] Assignee: Donnelly Corporation, Holland, Mich.

[21] Appl. No.: 451,956

[22] Filed: May 26, 1995

Related U.S. Application Data

[62] Division of Ser. No. 332,429, Oct. 31, 1994, which is a continuation of Ser. No. 945,238, Sep. 15, 1992, abandoned, which is a division of Ser. No. 760,077, Sep. 13, 1991, Pat. No. 5,178,448.

[51] Int. Cl.[6] ............................................... B60Q 3/02
[52] U.S. Cl. ........................................ 362/83.1; 362/83.3
[58] Field of Search ............................... 362/74, 83.1, 80, 362/83.3, 294, 373, 135, 140, 80.1

[56] References Cited

U.S. PATENT DOCUMENTS

| D. 289,989 | 5/1987 | Skogler et al. . |
| D. 300,312 | 3/1989 | Skogler et al. . |
| 1,973,908 | 8/1934 | McIlwee . |
| 2,046,393 | 7/1936 | Lewinsohn et al. . |
| 2,580,258 | 12/1951 | Tarasuk . |
| 2,640,909 | 6/1953 | Montgomery . |
| 3,211,903 | 10/1965 | McElreath . |
| 3,543,018 | 11/1970 | Barcus et al. . |
| 4,479,172 | 10/1984 | Connor . |
| 4,511,954 | 4/1985 | Marcus et al. . |
| 4,646,210 | 2/1987 | Skogler et al. . |
| 4,733,336 | 3/1988 | Skogler et al. . |
| 4,882,565 | 11/1989 | Gallmeyer ........................ 362/83.1 |

FOREIGN PATENT DOCUMENTS

| 551492 | 8/1954 | Canada . |
| 1292308 | 9/1962 | France . |
| 877866 | 7/1949 | Germany . |
| 3614882 | 3/1988 | Germany . |
| 652189 | 4/1951 | United Kingdom . |
| 933078 | 8/1963 | United Kingdom . |
| 1008411 | 10/1965 | United Kingdom . |
| 1136134 | 12/1968 | United Kingdom . |

OTHER PUBLICATIONS

Exhibits A–D: Photographs of a BMW rearview mirror.
Exhibits E and F: Additional photographs of the frame bezel and mirror of the partially assembled BMW mirror shown in Exhibits A–D; and,
Exhibits G–L: Photographs of an entire BMW mirror assembly.

*Primary Examiner*—Y My Quach
*Attorney, Agent, or Firm*—Van Dyke, Gardner, Linn & Burkhart, LLP

[57] ABSTRACT

A rearview mirror with lighting assembly for use in a vehicle, has a molded case adapted to support lights for illuminating portions of the vehicle interior, to support electrical switches, wiring, and electrical connectors, to support optical lenses for directing light, and to support a mirror element. The case includes ventilation around the lenses, past the lights, and out of the case for dissipating heat from the lighting. The electrical switches and connectors are mounted into the case. A preferred light arrangement provides illumination of areas below and outwardly of the case ends with targeted lighting areas in the lap areas of persons seated in the front seats of the vehicle, without allowing light to be directed toward the vehicle windshield or instrument panel to cause glare. A resilient sealing material is adhered to the back of the lens element for sealing with the case to prevent or minimize the emission of uncontrolled, stray light from the case. The sealing material is preferably adhered to the mirror element by an adhesive carrier layer which preferably also provides an antiscatter function for the mirror element in the event of breakage.

41 Claims, 11 Drawing Sheets

REARVIEW MIRROR WITH LIGHTING ASSEMBLY

CROSS REFERENCE TO RELATED APPLICATIONS

This is a division of application Ser. No. 08/332,429, filed Oct. 31, 1994, which is a continuation of application Ser. No. 07/945,238, filed Sep. 15, 1992, now abandoned which is a division of Ser. No. 07/760,077, filed Sep. 13, 1991, now issued as U.S. Pat. No. 5,178,448.

BACKGROUND OF THE INVENTION

The present invention relates to rearview mirror assemblies for vehicles and, more particularly, to a case assembly for a rearview mirror which provides lighting for illuminating selected portions of a vehicle interior and which includes controls for providing such illumination, mounted on the front of the assembly.

Various types of rearview mirror assemblies which provide lighting have been used in the past. One such structure includes a housing secured to the back of a rearview mirror case and having a pair of light assemblies mounted on the housing for insertion into the case, through openings in the case back, so that light is directed downward from the spaced lights. The lighting provided by the structure was appropriate for low level interior courtesy lighting for the front passenger area of a vehicle. However, the housing of this prior mirror assembly wrapped around the case back to the bottom of the case and was, in part, visible by the driver of the vehicle. Moreover, adaptability of this assembly to sophisticated vehicle interior designs was limited.

Subsequent rearview mirror assemblies including lighting as an integral part of the assembly have been developed. Such development commonly involved inserting a miniature lamp assembly into a standard mirror case which had been minimally modified to increase interior volume as required for the lamp assembly. Many such assemblies have developed overheating problems and are commonly expensive devices with fragile control wiring. A common practice for providing electrical current to such prior illuminating mirror assemblies commonly involved a wire raceway extending out of the mirror case for connection with the vehicle electrical power circuit. These wire raceways which extend from the mirror case are subject to twisting and tension, each of which tend to wear and break the raceway and transmit stress to wiring inside the case. Further, the wiring inside the mirror case has commonly employed slip fit connectors at each electrical component. Such connectors are often subject to disconnection because of vibration and other causes, inherent in a vehicle environment.

Such prior assemblies are also commonly susceptible to the development of glare in the mirror element, on the vehicle windshield, and on the vehicle instrument panel, because of the emission of stray or uncontrolled light. As may be well appreciated, such glare creates a safety hazard. In a passenger compartment of a vehicle, it is desirable to minimize, if not eliminate, glare reflecting from the windshield or the instrument panel. Thus, a primary consideration in the design of an illuminating mirror assembly is the containment and direction of light generally away from the windshield and dash areas and toward the laps of the passengers, where the lighting will be most useful.

The present invention was conceived as a solution for and an improvement over the above and other design limitations of prior known lighted rearview mirror structures which provide illumination.

SUMMARY OF THE INVENTION

Accordingly, the present invention provides a case assembly for vehicular rearview mirrors adapted to define a compartment on or within the case, and which, in a preferred embodiment is effectively sealed against the back of the mirror element. Preferably, the sealing means also provides an antiscatter function for the mirror element in the event of breakage.

A rearview mirror assembly according to one form of the present invention includes a case having a back wall and a perimeter side wall defining an interior space within the case. Walls extending within the case from the back wall define a compartment within the case. The compartment is connected with the outside of the case through an opening located in a bottom portion of the side wall. A mirror element is supported and retained by the case, opposite from the back wall. A sealant is provided between the compartment walls and the back of the mirror element to seal the compartment and prevent escape of uncontrolled or stray light from the compartment.

In one aspect of the invention, a reflector with a progressive or variable radius of curvature is provided in the compartment for selectively directing light out of the compartment. In another aspect of the invention, the case is adapted to receive electrical components, specifically, controls, light bulb holders and a power plug, for powering a lamp assembly positioned in the compartment. The electrical components are mounted to the housing for improved durability and reliability of the control wiring system. Specifically, a power plug connects the mirror assembly with the vehicle electrical system and the power plug is mounted in the back wall of the case of the mirror assembly. A switch is provided in the mirror assembly and also mounted to the case for controlling the electrical current to and thus illumination of the lamp assembly. Finally, the electrical components, i.e. the power plug, the switch, and the lamp assembly, are directly connected, one with another, by wiring, without intermediate connectors.

In yet another aspect of the invention, a lens is mounted in the side wall opening to refract and reflect light projected from the lamp assembly, away from the windshield and instrument panel of a vehicle in which the assembly is mounted. In a further aspect of the invention, the compartment on or within the cases is ventilated to dissipate heat from the compartment. The lens and opening define a ventilation passage between the lens and the case for the flow of air from outside the case, around the lens, and into the compartment. A ventilation hole or passage in the back of the mirror case and communicating with the compartment is also provided. A ventilation conduit, positioned generally opposite the compartment from the lens, may also be provided and extends from the compartment to outside the case. A light baffle or maze is formed by the conduit so that light may not escape from the compartment through the ventilation conduit.

The rearview mirror assembly of the present invention provides an improvement over the prior art with a simplified and more durable lighting assembly. Many of the electrical interconnections which are used in previous control wiring systems have been eliminated in the present mirror assembly to enhance durability. Improved sealing of stray or uncontrolled lighting is also accomplished in the present assembly. Further, enhanced control of the distribution pattern of light projected from the assembly is provided by unique reflector usage and design and by unique lens design. Also, improved ventilation of the lighting assembly is also provided. All of

BRIEF DESCRIPTION OF THE DRAWINGS

FIG. 5 is a right end elevational view of the mirror assembly of FIG. 1, the opposing end being substantially similar;

DESCRIPTION OF THE PREFERRED EMBODIMENTS

Figure 1:
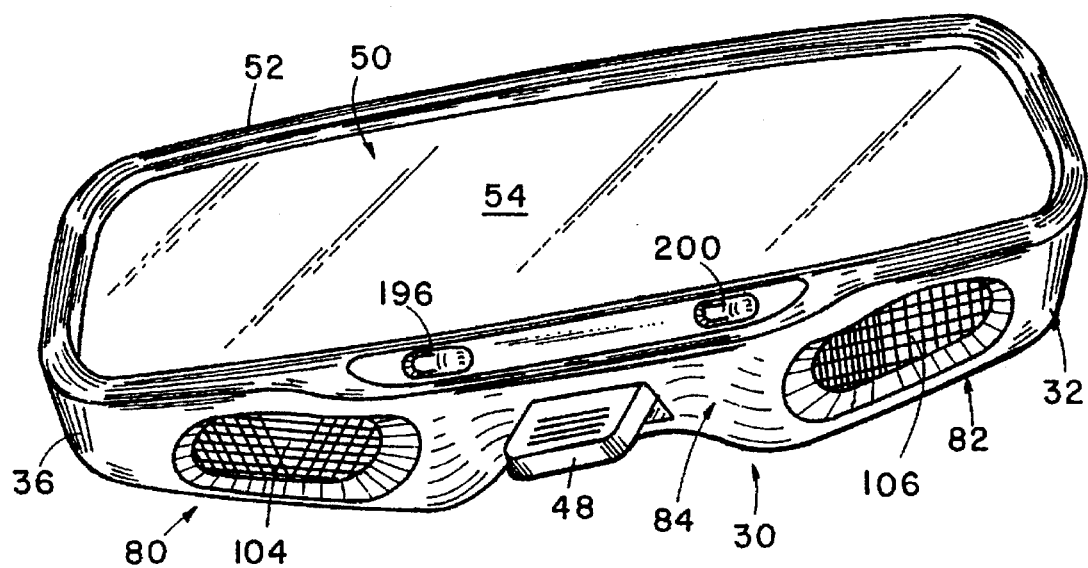
FIG. 1 is a lower front perspective view of a mirror assembly according to the present invention.

Referring to the drawings in greater detail, a mirror assembly 30 according to the present invention is generally shown in FIGS. 1-31. Assembly 30 has a case 32 with a back wall 34 and a perimeter side wall 36, defining an interior space within case 32 (FIGS. 6-9). Case 32 may be molded of a variety of known, suitable materials, but is preferably molded of a fiber reinforced plastic and most preferably of a 13% glass fiber reinforced nylon plastic. A mounting aperture 38 in back wall 34 is generally centered along the length of case 32 and is preferably located near an upper portion 40 of sidewall 36 (FIG. 2). A mounting arm 42 is connected with case 32 by an actuator 44, described below. Mounting arm 42 extends from case 32 to a fixed member of a vehicle for mounting assembly 30 in the vehicle.

Figure 5:
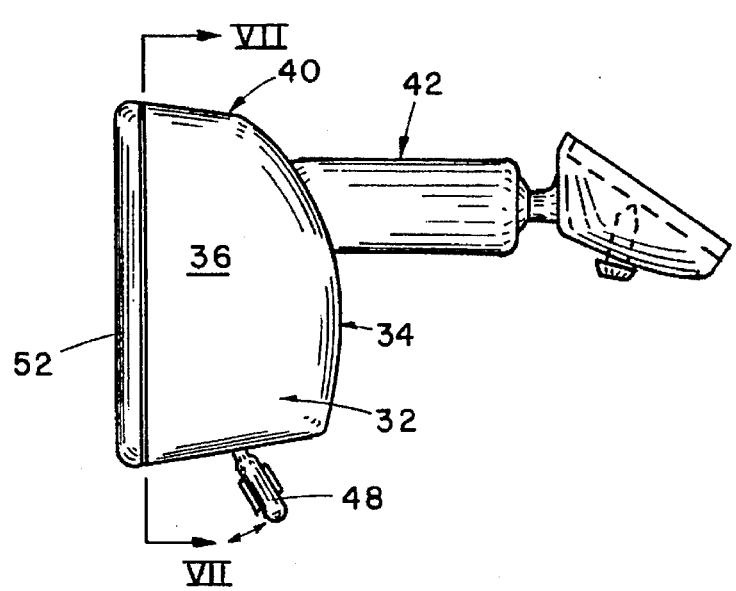
Figure 6:
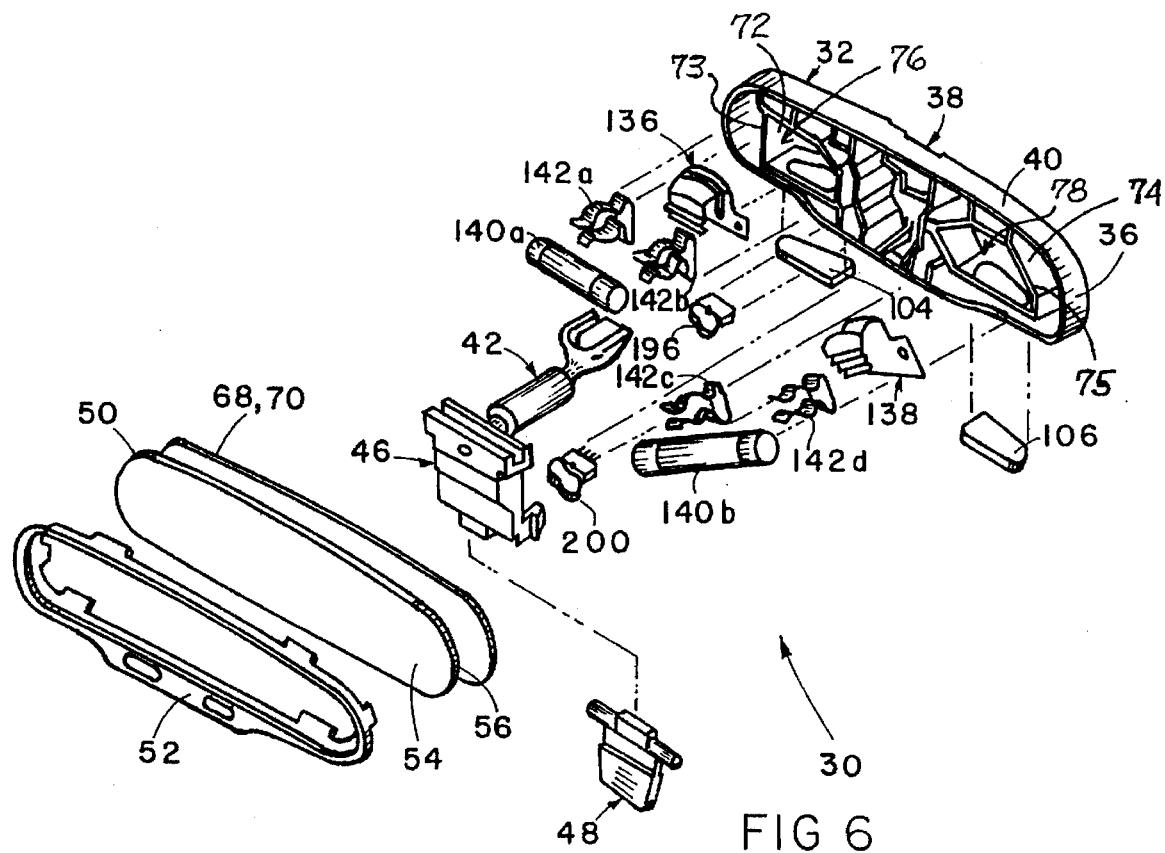
FIG. 6 is an exploded perspective view of the mirror assembly of FIG. 1.

Assembly 30 is preferably a day/night rearview mirror having a high reflectivity day position and a reduced reflectivity night position, wherein reflection of undesired and distracting glare from behind the vehicle is reduced or eliminated in the night position. Thus, mounting arm 42 is preferably connected with case 32 through a day/night actuator 44 (FIGS. 2, 5 and 6). Actuator 44 may comprise a toggle member 46 and a pivot lever 48 as are known in the art. Actuator 44 is preferably of the type disclosed in copending and commonly assigned U.S. Pat. No. 5,327,288 entitled REDUCED VIBRATION DAY/NIGHT REARVIEW MIRROR ASSEMBLY, invented by Wellington et al. and filed on even date herewith, the disclosure of which is hereby incorporated by reference.

A prismatic mirror element 50 is mounted to the front of case 32, opposite back wall 34, by a circumscribing bezel 52 (FIGS. 1, 3-6, 9 and 11). Mirror element 50 is preferably a transparent, prismatic element of glass or plastic or other suitable optical material and has nonparallel front 54 and back 56 surfaces. Back surface 56 has a thin layer of reflective material such as metallic silver or chrome or the like as is commonly known and is most preferably provided with a protective, antiscatter layer for safety in the event the mirror element is broken.

Figure 9:
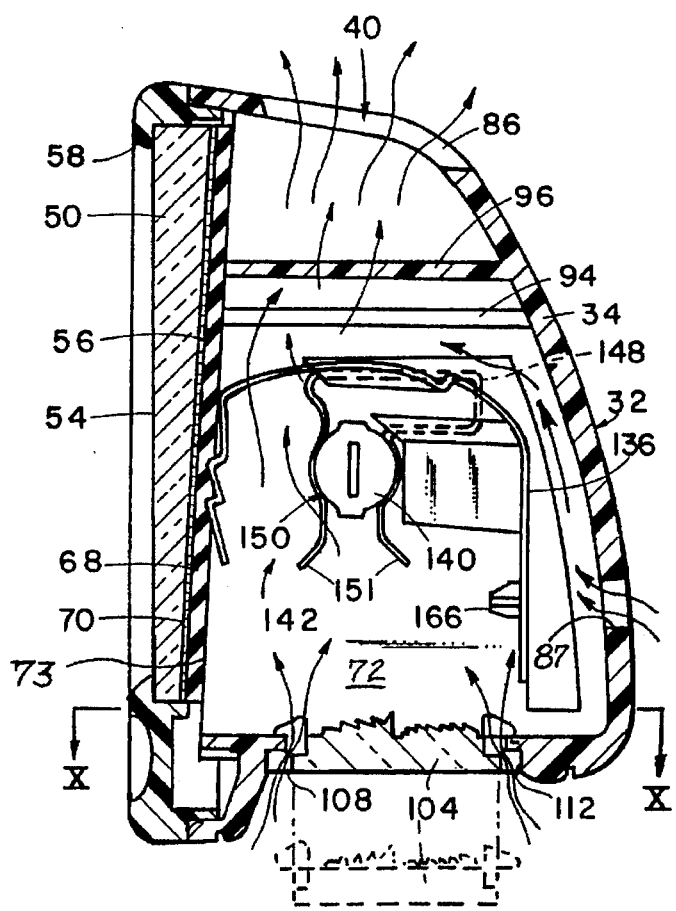
FIG. 9 is a cross-sectional view along plane IX—IX of FIG. 7.
Figure 11:
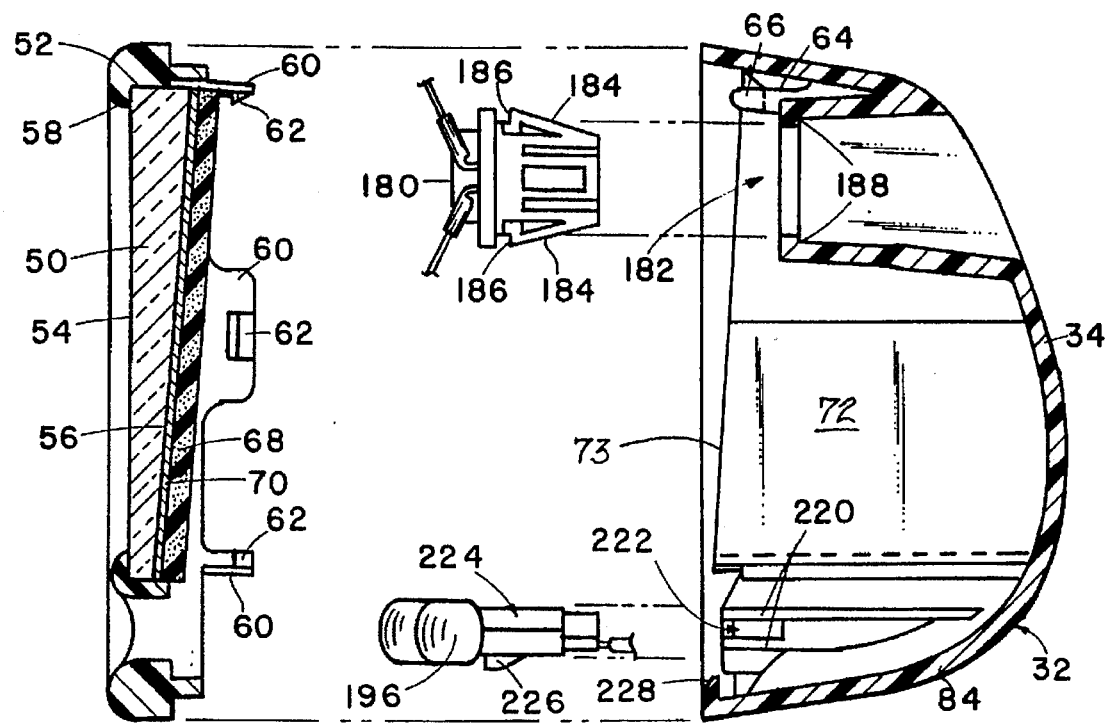
FIG. 11 is an exploded sectional view along plane XI—XI of FIG. 8.
Figure 16:
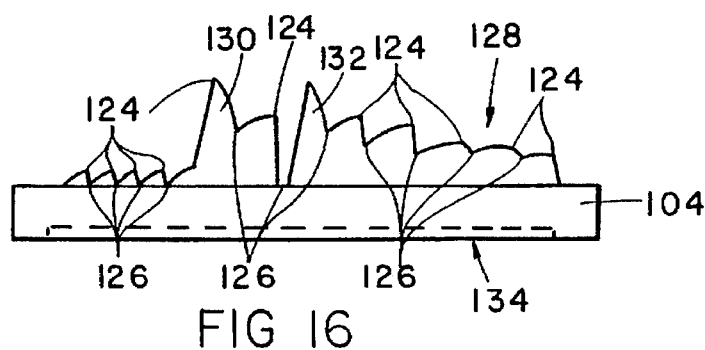
FIG. 16 is an end elevational view of the driver's side lens.
Figure 17:
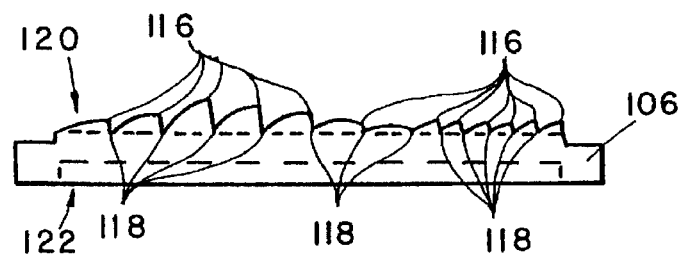
FIG. 17 is an end elevational view of the passenger's side lens.

As mentioned above, bezel 52 circumscribes mirror element 50 and further, has a circumferential lip 58 which extends over front surface 54 of mirror element 50, near the perimeter edge of the mirror element, to capture and hold mirror element 50 against case 32 (FIGS. 9 and 11). Bezel 52 is irremovably connected with case 32 by a series of perimeter latch fingers 60 which extend toward case 32 from bezel 52 and have a projecting, wedge shaped hook 62 on the side of each finger 60 for engagement with corresponding latch loops 64, provided around the perimeter of case 32. Each latch loop 64 is a generally U-shaped member having a bight portion 66 for engagement with one of hooks 62. Fingers 60 are forced between perimeter side wall 36 and latch loops 64 to wedge each bight portion 66 away from side wall 36 until hook 62 passes bight portion 66, which then returns to its previous position and captures the hook to prevent withdrawal.

Case 32 preferably seals against back surface 56 of mirror element 50. Most preferably, a resilient foam layer 68, such as commonly available polyester, number four, closed cell foam, generally covers and is adhered to back surface 56 by an adhesive carrier layer 70 (FIGS. 9 and 11). Carrier layer 70 is preferably a polyester film of about two mil thickness, coated with a synthetic rubber base PSA adhesive to adhere to back surface 56. When adhered to back surface 56, carrier layer 70 provides the antiscatter function discussed above, for mirror element 50.

Figure 7:
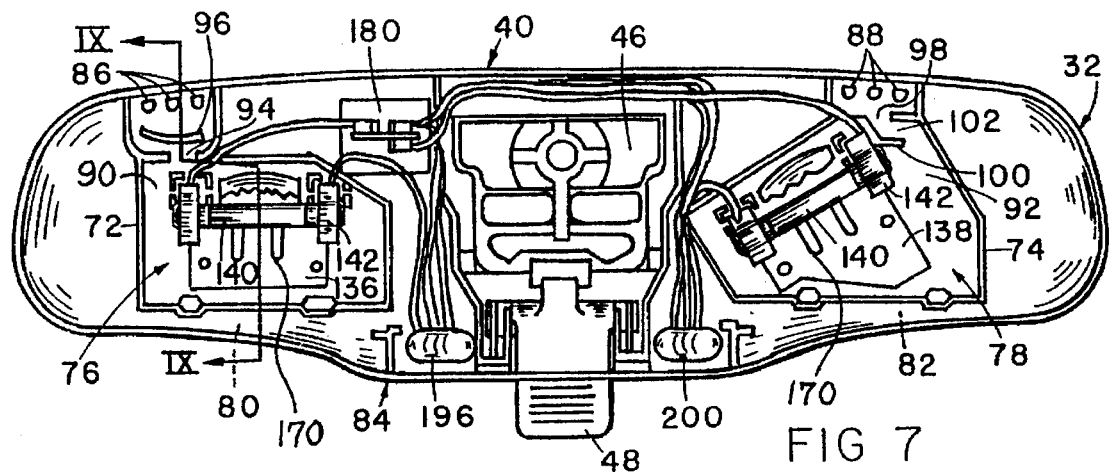
FIG. 7 is a sectional view along plane VII—VII of FIG. 5.
Figure 8:
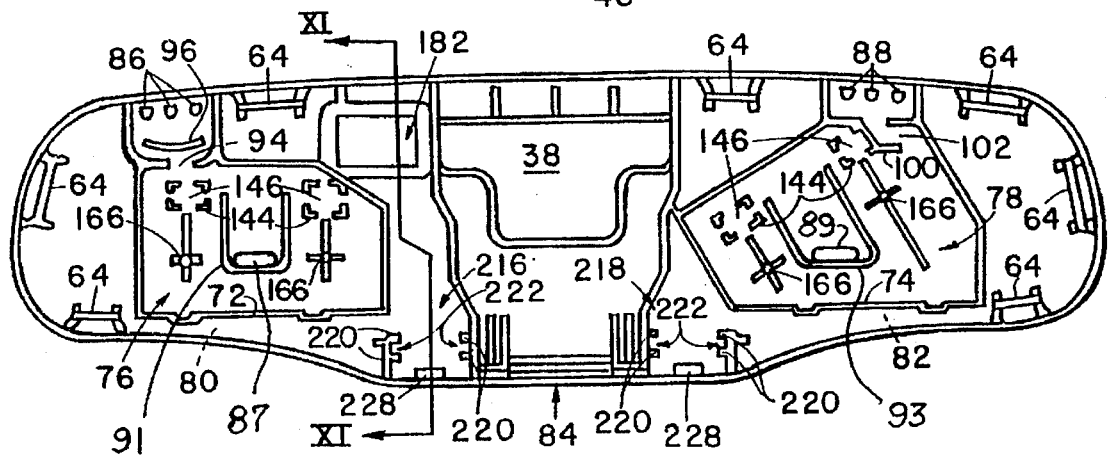
FIG. 8 is a front elevation of the mirror housing of FIG. 7 with the components removed to show only the housing.

Walls 72, 74 extend generally forward from back wall 34 and define a driver's side closed lamp compartment 76 and a passenger's side closed lamp compartment 78 inside case 32 for housing illuminating lamp assemblies (FIGS. 7 and 8). Foam layer 68 provides a light seal for each compartment 76, 78 by engaging the forwardly extending terminal end edges 73, 75 (FIGS. 6, 9 and 11) of walls 72, 74. As explained below, except for light transmitting openings 80, 82 and various ventilation holes, such sealing layer closes each compartment and prevents the escape of uncontrolled, stray light from bulbs 140 past the ends of the compartment walls. Further, an opening 80 for the driver's side and an opening 82 for the passenger's side are provided in a bottom portion 84 of side wall 36 for transmitting light out of each compartment 76, 78 and case 32.

Ventilation is provided for each compartment 76, 78 by ventilation holes 86, located above compartment 76, and ventilation holes 88, located above compartment 78 (FIGS. 2, 4, 7 and 8). Ventilation holes 87, 89 (FIGS. 2, 8 and 9) extend through back wall 34 at a position spaced below ventilation holes 86, 88, respectively, in the lower area of each compartment 76, 78. U-shaped walls 91, 93 on back wall 34 extend around and below vent holes 87, 89 within each compartment such that each wall has a portion between vent hole 87 or 89 and opening 80 or 82 as well as portions extending upwardly on either side of the respective vent holes. Walls 72 and 74 extend to side wall upper portion 40, defining ventilation conduits to connect holes 86 and 88 with compartments 76 and 78, respectively. However, a straight path is not allowed out through holes 86 and 88 from compartments 76 and 78. A light maze or baffle is formed between each of holes 86 and 88 and a main chamber of each compartment 76, 78 so that light may not escape through holes 86 and 88, from the respective compartment 76, 78, to cause potential glare (FIGS. 7–9).

On the driver's side, narrowed throat 94 is formed between holes 86 and a main portion of compartment 76, along conduit 90, by walls 72 (FIGS. 7 and 9). A baffle plate 96 extends forward from back wall 34, between throat 94 and holes 86. Baffle 96 is wider than throat 94 and extends laterally across holes 86 so that a direct light path does not exist out of compartment 76, through holes 86. Baffle 96 does not, however, extend to walls 72 to thus provide air flow from compartment 76, through throat 94, around either end of baffle 96, and out vent 86.

On the passenger's side, narrowed throat 98 is formed between holes 88 and a main portion of compartment 78, along conduit 92, by walls 74, similar to the driver's side of assembly 30 (FIGS. 7 and 8). Unlike the driver's side, though, a baffle plate 100 extends forward from back wall 34, between throat 98 and the main portion of compartment 78. Further, baffle 100 does extend to wall 74 at one end of baffle 100, maintaining an air passage at the opposing end of baffle 100. In fact, baffle 100 extends from one side of throat 98, defining a bent channel portion 102 of conduit 92 for the passage of air from compartment 78, through channel 102, and out holes 88 and for blocking the escape of light from compartment 78.

Figure 2:
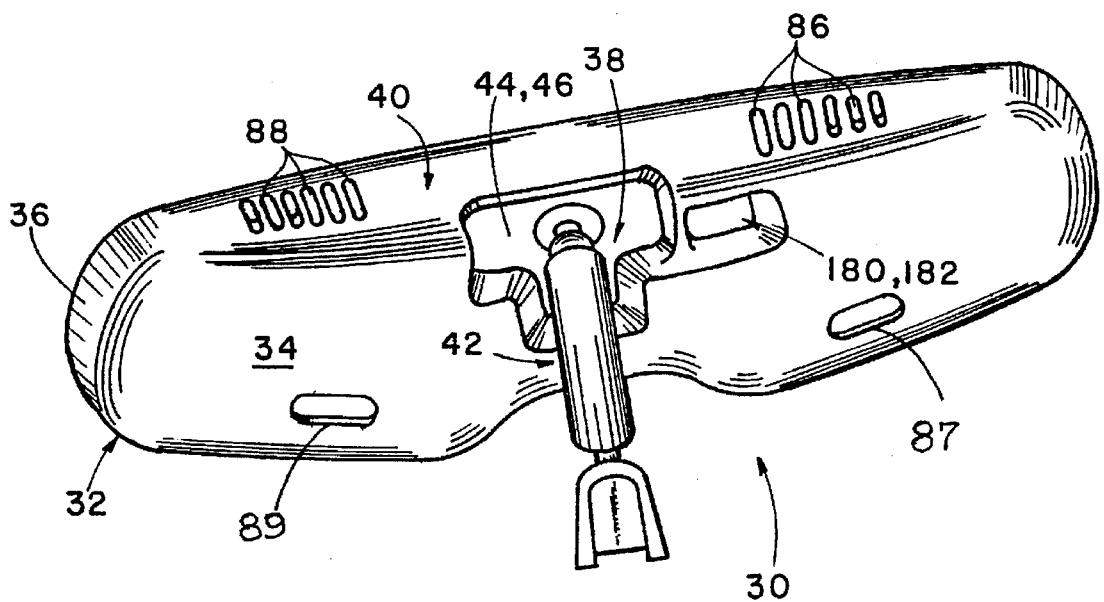
FIG. 2 is an upper rear perspective view of the mirror assembly of FIG. 1.
Figure 3:
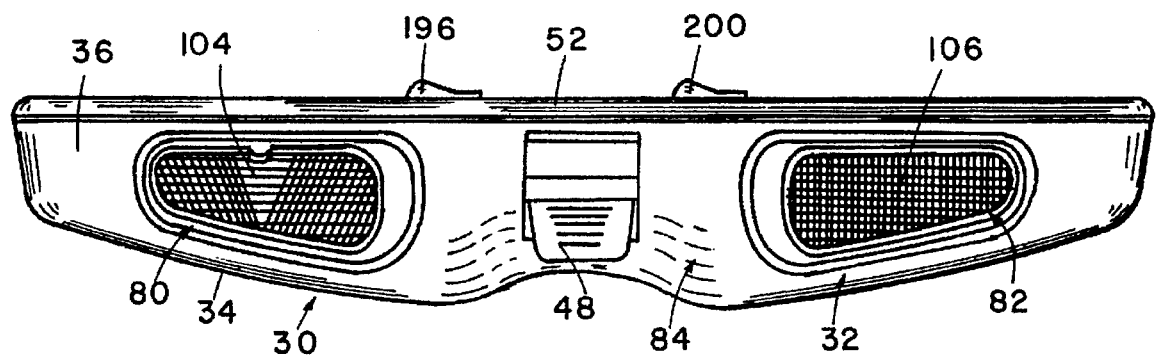
FIG. 3 is a bottom plan view of the mirror assembly of FIG. 1.
Figure 4:
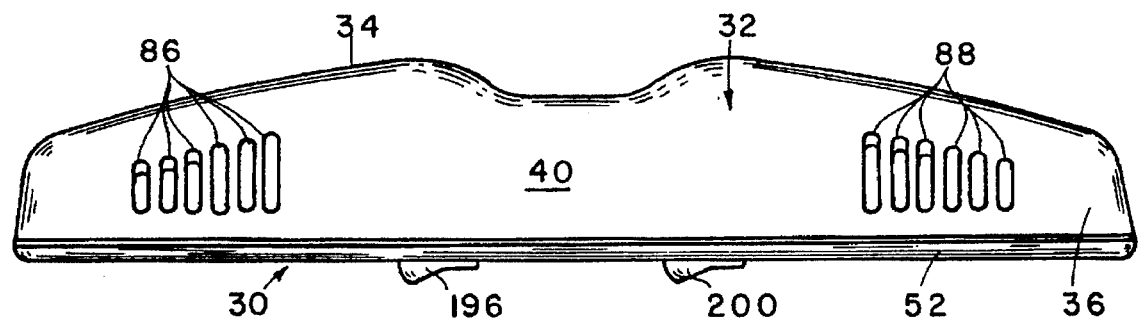
FIG. 4 is a top plan view of the mirror assembly of FIG. 1.
Figure 10:
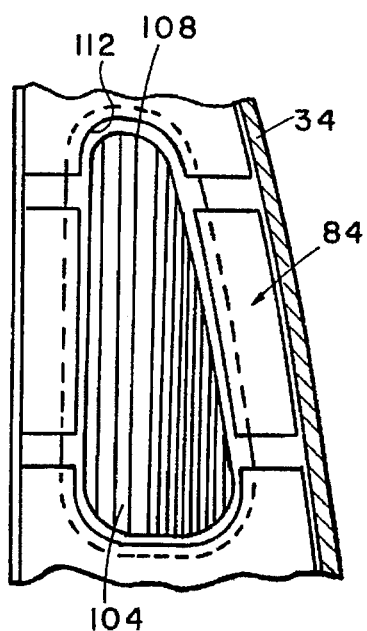
FIG. 10 is a fragmentary plan view along plane X—X of FIG. 9.

A driver's lens 104 and a passenger's lens 106 are positioned in each opening 80 and 82, respectively (FIGS. 1, 3, 7 and 8). As is best seen in FIGS. 1 and 9, each lens is recessed into the case bottom sufficiently to eliminate direct light into the eyes of the driver or passenger. This is accomplished by molding case with openings 80,82 recessed into the sidewall bottom. Each lens 104, 106 has a perimeter edge 108, and each opening has a perimeter edge 112 (FIG. 10). The lens edge 108 is spaced from the opening edge 112 defining a ventilation passage into compartments 76 and 78 through openings 80 and 82, around the lenses 104, 106, respectively (FIGS. 7–9). Thus, air may enter the compartments 72, 76 through holes 87,89 and around the lenses 104, 106 and vent off heat, through the light baffles and vent holes 86 and 88.

Figure 29:
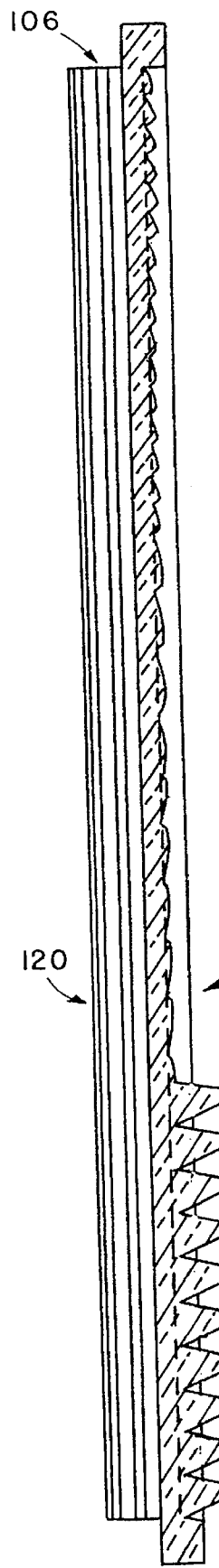
FIG. 29 is an enlarged cross-sectional view along plane XXIX—XXIX of FIG. 25, showing specific dimensions.

Each lens 104, 106 is a transparent element of glass or plastic or other suitable optical material and is preferably molded of a clear polycarbonate plastic such as LEXAN, which is commonly available from the General Electric Corporation. Passenger's lens 106 has a series of generally parallel ridges 116 and grooves 118 extending across a top surface 120 to refract and reflect light from compartment 78 generally forward relative to mirror assembly 30 and away from the vehicle's windshield (FIGS. 17, 24, 25, and 28). Generally, the surfaces of ridges 116 are polished smooth except for the surfaces of optical facets C (FIG. 28) which are made slightly dull to help diffuse light in these areas. A Fresnel lens pattern typically formed using rotary cutters, is provided at 90° to ridges 116 and grooves 118 on a bottom surface 122 of passenger's lens 106 to control lateral dispersal of light projected through the lens, principally minimizing the potential for any uncontrolled stray light to be projected toward the driver (FIG. 29).

Figure 18:
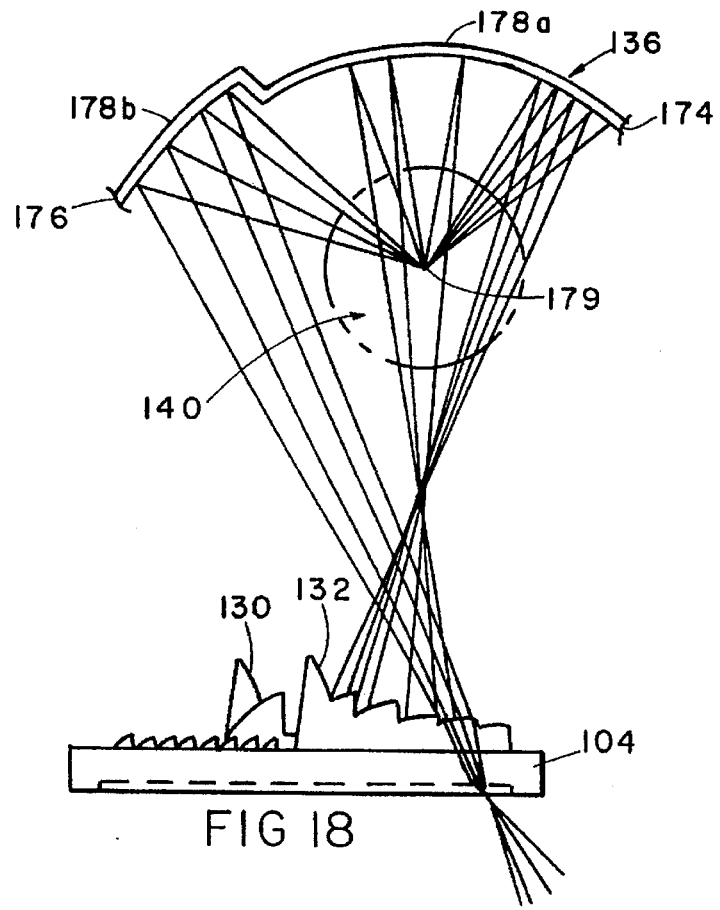
FIG. 18 is a schematic diagram of the view of FIG. 9, showing a light ray trace from the driver's side light bulb filament.
Figure 19:
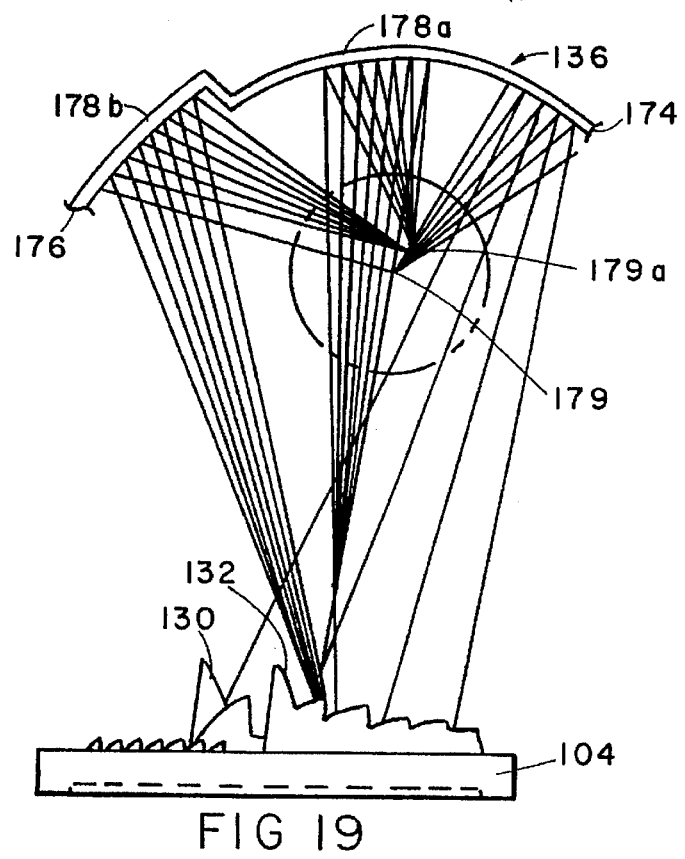
FIG. 19 is the view of FIG. 18 with the filament deviated from the design location.
Figure 26:
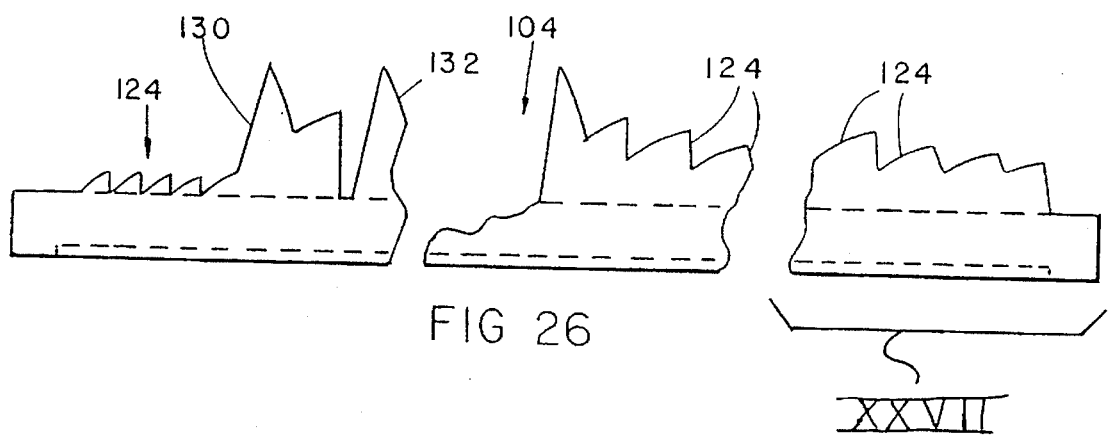
FIG. 26 is the view of FIG. 16 exploded into three fragments and showing specific dimensions.
Figure 27:
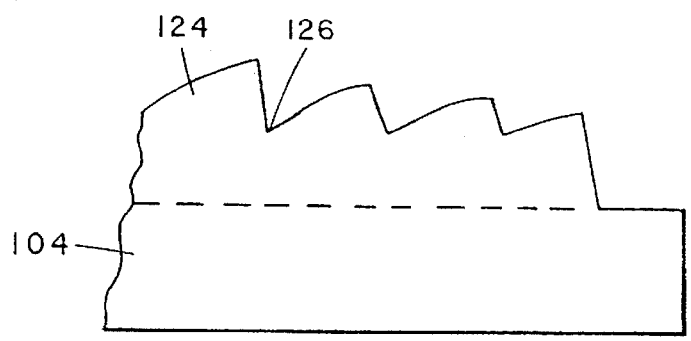
FIG. 27 is an enlarged view of detail XXVII of FIG. 26, showing specific dimensions.
Figure 28:
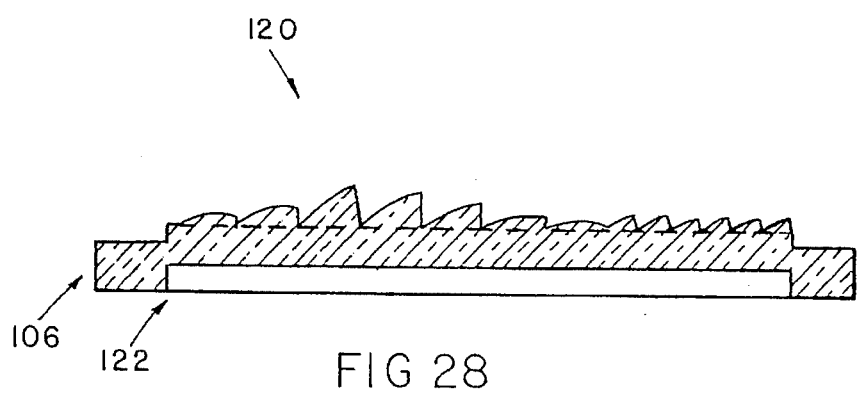
FIG. 28 is the view of FIG. 17, showing specific dimensions.

Similar to passenger's lens 106, driver's lens 104 also has a series of laterally extending, generally parallel ridges 124 and grooves 126 across a top surface 128 (FIGS. 16, 22, 23, 26, and 27). However, direction and control of light projected from compartment 76, away from the instrument panel of the vehicle, is somewhat more critical on the driver's side than on the passenger's side. Therefore, ridges 124 and grooves 126 include prominent, taller teeth 130 and 132 which refract or reflect and block light which would otherwise be projected to the instrument panel, causing glare (FIGS. 18, 19, and 26). As with passenger's side lens 106, lens 104 has parallel and planar surfaces on ridges 124 which face generally away from case back 34 while parallel and curved surfaces on the ridges face generally toward back wall 34. The curved surfaces on taller teeth 130, 132 do face away from case back 34 however, while the planar surfaces on those teeth face toward the case back. Also, ridges 130, 132 project above their adjacent grooves by at least twice as far as the remaining ridges project above their grooves to insure all remaining light is directed forwardly as described below. Generally, the surfaces of all ridges 124 are polished smooth except for the surfaces of optical facets 3A on tooth 130, and of optical facets 7 and 8 (FIGS. 26 and 27). These surfaces are made slightly dull with sandpaper to help diffuse light in these areas.

Figure 23:
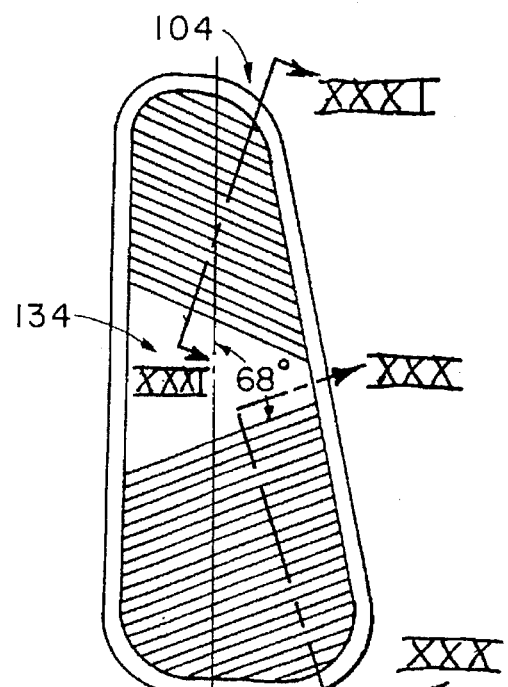
FIG. 23 is a bottom plan view of the driver's lens.
Figure 24:
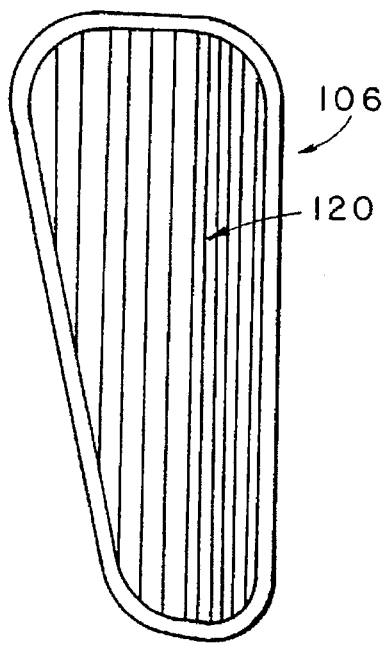
FIG. 24 is a top plan view of the passenger's lens.
Figure 25:
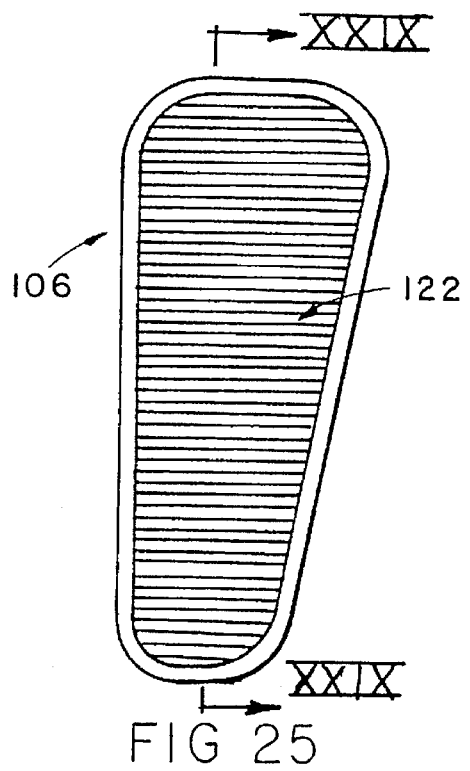
FIG. 25 is a bottom plan view of the passenger's lens.
Figure 30:
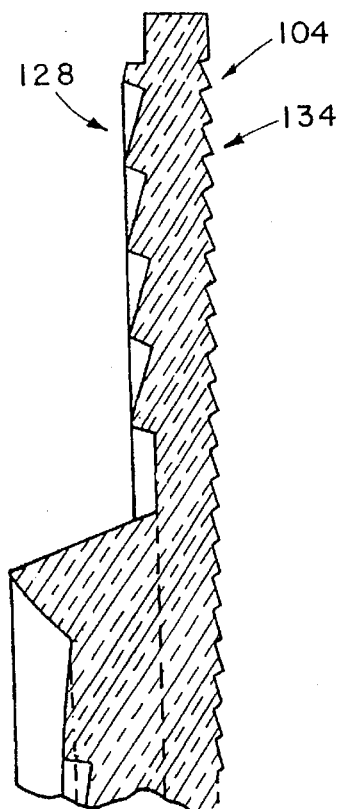
FIG. 30 is a fragmentary cross-sectional view along plane XXX—XXX of FIG. 23, showing specific dimensions.
Figure 31:
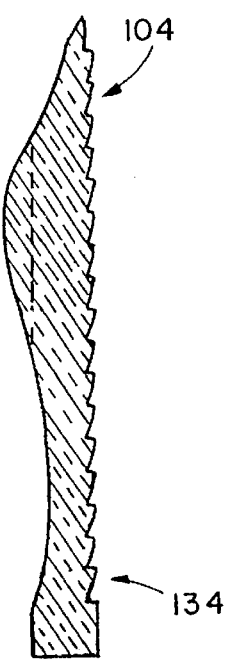
FIG. 31 is a fragmentary cross-sectional view along plane XXXI—XXXI of FIG. 23, showing specific dimensions.

A slightly different Fresnel lens pattern from that on lens 106 and also formed with rotary cutters is provided on a bottom surface 134 of driver's lens 104 to control lateral dispersal of light projected through the lens and to help direct light away from the instrument panel and into the passenger compartment (FIGS. 23, 30 and 31). Typically, Fresnel lens optic facets or elements in vehicular interior lighting fixtures on one lens surface are oriented at 90° to the optic facets, ridges and grooves on the opposite surface as in passenger side lens 106. Hence, one side (120) is used for directing light away from the instrument panel while the opposite side (122) provides lateral or side to side direction and target control. In lens 104, however, the Fresnel optic facets or elements are at an angle to the grooves and ridges 124, 126 on side 128 other than at 90° to help control and direct light away from the instrument panel as well as controlling the lateral light direction. Preferably, the Fresnel facets are oriented in a V-shaped pattern (FIG. 23) each at an angle of about 68° to ridges and grooves 124, 126 on top surface 128. The V-shaped Fresnel pattern also helps to smoothly spread the light over the target area.

Each of a reflector 136, 138, a light bulb 140, and bulb holders 142, are also located in compartment 76 and 78, respectively (FIG. 7). Bulbs 140 are preferably a cartridge style bulb, having a metallic connector at each end and a four candle power rating.

Bulb holders 142 are held in case 32 by insertion into receptacles 144 formed in case 32 by upstanding posts and walls which project forward from back wall 34 and provide openings to dissipate heat, presenting an aperture 146 which corresponds to bulb holders 142 (FIGS. 7 and 8). Bulb holders 142 are stamped and formed from strips of springy and conductive metal to define a fastening tang 148 for insertion into receptacles 144 (FIG. 9). Projecting generally perpendicularly to fastening tang 148, at one end, bulb holders 142 have a generally cylindrically shaped area 150 where a bulb 140 is positioned in use. Flared receiving flanges 151 for ease of insertion of bulb 140 into cylindrical area 150 are also provided.

The configuration of receptacles 144 and bulb holders 142 utilizes a forward to rearward direction relative to case 32 for inserting holders 142 into receptacles 144, enhancing a manufacturer's assembly. Further, the direction of insertion and removal of bulb 140 from bulb holders 142 is perpendicular to the direction for inserting holders 142 into receptacles 144, minimizing the potential for inadvertently removing holders 142 from receptacles 144 during subsequent removal and replacement of a damaged bulb.

Each reflector 136, 138 is preferably formed as a generally U-shaped member from 0.020 inch (0.50 mm) thick, bright dipped, anodized, quarter hard aluminum 5657 alloy (FIGS. 12–15). Reflectors 136 and 138 have mounting flanges 152, 154 and heat shields 156, 158 extending in the same general direction from opposite edges of a bight portion 160, 162, respectively. The inside surfaces of reflectors 136, 138 preferably provide at least 80% reflectivity. A pair of mounting apertures 164 are provided in each mounting flange 152, 154 for snap or force fit over corresponding mounting posts 166, which project forward from back wall 34 of case 32 (FIGS. 7 and 8). Ridges 168 are formed along each heat shield 156, 158, generally parallel to bight portions 160 and 162, to minimize the area of contact between the heat shields 156, 158 and back surface 54 of mirror element 50 and any foam layer 68 thereon and, thus, the amount of heat transferred to mirror element 50 and layer 68 (FIGS. 9 and 12–15). Further, ventilation slots 170 are positioned in mounting flanges 152, 154 for enhanced air convection around the reflectors 136, 138, respectively.

Figure 14:
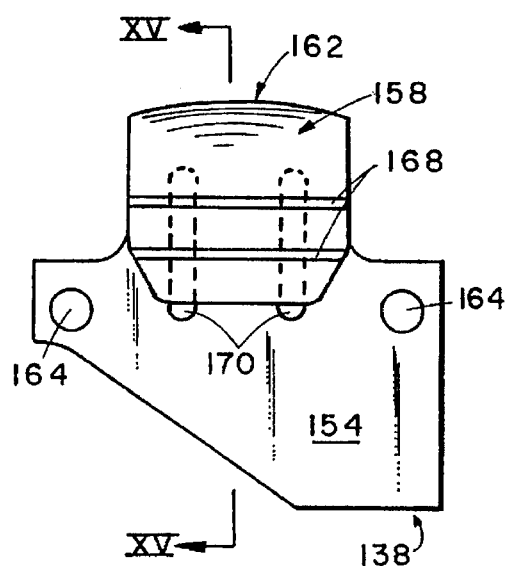
FIG. 14 is a front elevational view of the passenger side reflector.
Figure 15:
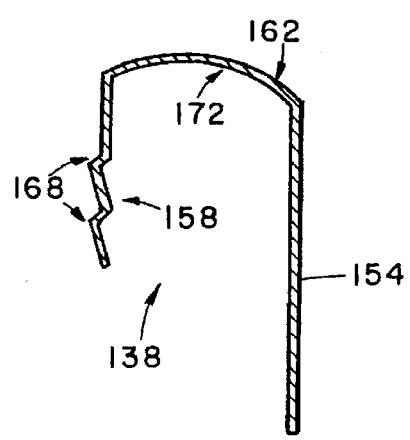
FIG. 15 is a cross-sectional view along plane XV—XV of FIG. 14.
Figure 20:
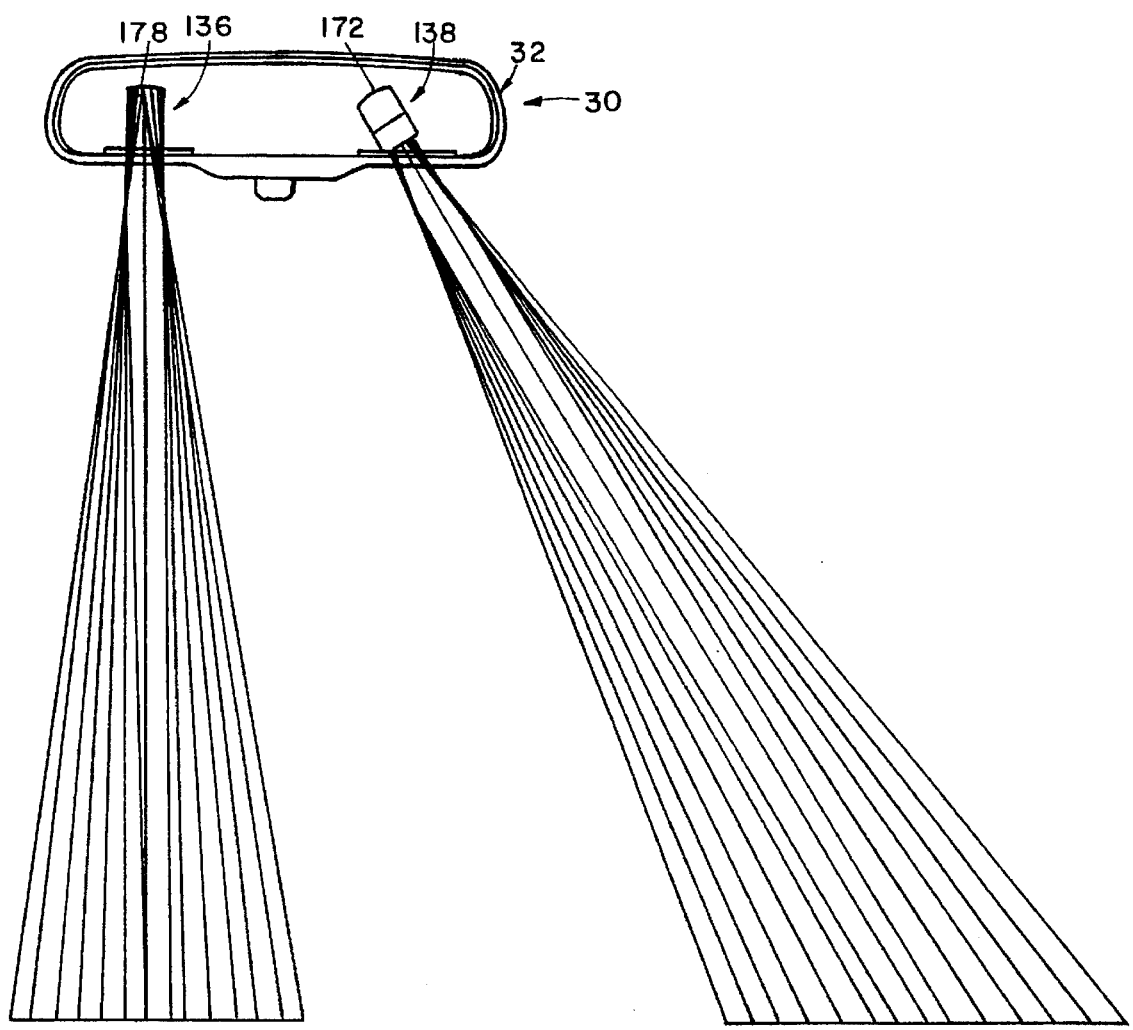
FIG. 20 is a front elevational view of the assembly of FIG. 1 showing a light ray trace from the assembly.
Figure 22:
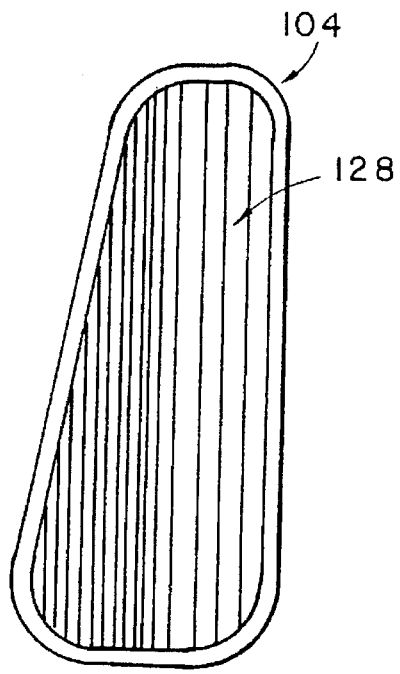
FIG. 22 is a top plan view of the driver's lens.

Passenger's reflector 138, is generally angled relative to case 32 to direct light generally away from the driver and to the lap area of the passenger (FIGS. 14, 15 and 20). Bight portion 162 of reflector 138 is generally spherically cup shaped, forming a reflective surface 172 to enhance the focus and direction of light projected from surface 172, away from the driver's side of the vehicle.

Figure 12:
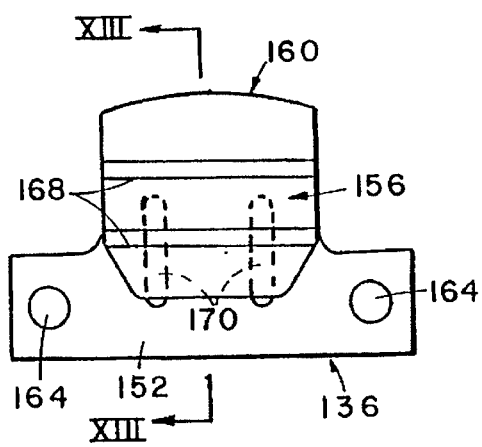
FIG. 12 is a front elevational view of the driver's side reflector.
Figure 13:
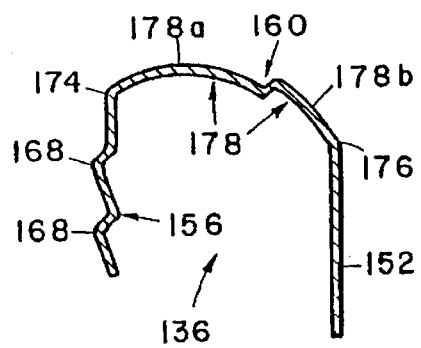
FIG. 13 is a cross-sectional view along plane XIII—XIII of FIG. 12.

Driver's reflector 136 is generally squarely oriented in case 32 to project light generally directly downward (FIGS. 12, 13 and 20). Bight portion 160 of reflector 136 is also generally spherically cup shaped, is curved along two axes, and has a progressively lengthening radius of curvature, moving from a front edge 174 of bight portion 160 to a back edge 176 of bight portion 160, near back wall 34, forming a reflective surface 178 (FIG. 18). The longer radius of curvature near back edge 176 directs light reflected from a filament 180 of bulb 140 farther forward, relative to mirror assembly 30, than the adjoining shorter radius portion of the reflector, toward front edge 174 (FIGS. 12, 13, 18 and 19). Also, the cup shape helps direct light toward the target lap area of the driver. While surface 178 may be a continuous, smoothly curved surface of progressively changing radius of curvature, a significant cost savings may be had by approximating the continuous, smoothly curved surface with a composite surface comprising adjoining, constant radius portions with the radii changing in a stepwise manner. Thus, surface 178 is preferably a composite surface, having a constant radius portion 178a and an adjoining constant radius portion 178b with a longer radius than portion 178a.

As shown in FIGS. 18 and 19 of a cross-sectional view of driver's reflector 136, driver's lens 104, and a light bulb 140, having a filament 179, and indicating light ray traces from filament 179, it is seen how each of the driver's reflector 136 and the driver's lens 104 independently and jointly direct the light emitted from filament 179, generally toward an area beneath and forward of mirror assembly 30. Uncontrolled, undesired, stray light which might otherwise project rearward of assembly 30 is reflected or blocked by higher teeth 130 and 132 of lens 104. This system of light control with reflector 136 and lens 104 is effective whether the bulb filament 179 is in its design position 179 as shown in FIG. 18 or is in a least desirably deviated position, upward and forward from a design position at position 179a, as shown in FIG. 19. Such deviation of filament 179 may commonly be experienced since specific placement of filament 179 within bulb 140 is not typically a concern of bulb manufacturers.

Figure 21:
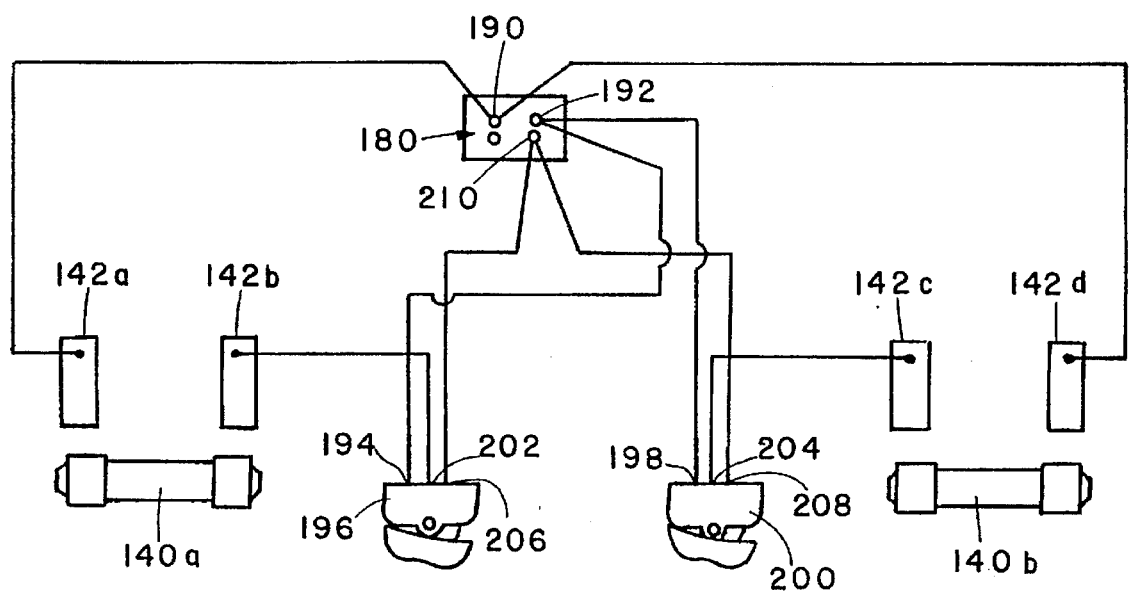
FIG. 21 is a schematic diagram of the wiring for the assembly of FIG. 1.

Electrical current for energizing bulbs 140 is provided through a wiring harness which is schematically shown in FIG. 21. A power plug 180 is mounted in case 32, through an aperture 182 in back wall 34 (FIGS. 2, 7, 8 and 11). Power plug 180 is a three conductor plug which snap fits into aperture 182 by resilient spring clips 184 which project at an angle with respect to power plug 180 and have a terminal end or shoulder 186 (FIG. 11). Clips 184 fold or compress when power plug 180 is inserted into aperture 182, clips 184 pass through the aperture, and snap back to their initial, spread position behind a lip 188, adjacent aperture 182. Shoulders 186 abut lip 188 to lock plug 180 in place in back wall 34. Power plug 180 may then be connected with the vehicle electrical system, typically a twelve volt, negative ground system, by a cooperating, power supply plug (not shown) which is adapted to mate with plug 180. By fixing power plug 180 to case 32, any tendency to physically stress and damage the internal wiring harness of mirror assembly 30 is minimized, if not eliminated. In contrast, prior mirror assemblies requiring wire connections to the interior of the assembly typically have a cable penetrating the case, whereby tension applied to the cable will stress the internal wiring of the mirror assembly, causing damage to the internal electrical system.

Referring specifically to FIG. 21, showing a schematic representation of the wiring harness for mirror assembly 30, power is supplied to mirror assembly 30 from the vehicle electrical system, through a power supply plug (not shown) which mates with power plug 180 and connects with a first terminal 190 in power plug 180, providing a source of current at terminal 190. Terminal 190 is in turn connected with a first bulb holder 142a, 142d of each of a driver's light bulb 140a and a passenger's light bulb 140b, respectively.

A second terminal 192 in power plug 180 provides a connection directly with the vehicle system ground. Terminal 192 is connected with a first contact 194 on a switch 196 for controlling the driver's lamp and is also connected with a first contact 198 on a switch 200 for controlling the passenger's lamp. Each switch 196, 200 is a single pole, double throw switch to provide connection between a center or common contact 202, 204 and a first contact 194, 198 or, alternatively, between the center contact 202, 204 and a third contact 206, 208, respectively, as is well known in the art. As shown in FIGS. 1, 3, 4, 6, 7 and 11, switches 196, 200 are located in the front face of bezel 52 to be accessible visibly and physically to the driver and/or passenger. Such location also indicates to the driver and/or passenger that additional features, namely lights, are included in the mirror assembly.

Common contact 202 of switch 196 is connected with a second bulb holder 142b so that when switch 196 is closed between the first 194 and common 202 contacts, a circuit is completed and bulb 140a is illuminated. Similarly, common contact 204 of switch 200 is connected with a second bulb holder 142c so that when switch 200 is closed between first contact 198 and common contact 204, a circuit is closed and bulb 140b is illuminated.

A third terminal 210 in power plug 180 provides connection with the vehicle system ground through a vehicle door switch system (not shown) as is commonly known for providing a connection with the vehicle system ground when a vehicle door switch is closed by opening a corresponding vehicle door. Third terminal 210 is connected with the third contact 206, 208 in each of the driver's and passenger's switches 196, 200, respectively. When each switch 196, 200 is not closed between its common contact 202, 204 and its first contact 194, 198, each switch is closed between the common contact 202, 204 and the third contact 206, 208, respectively. Thus, each switch 196, 200 will operate to either close directly to ground and allow electrical current to pass through and illuminate the light bulbs 140a, 140b, or each switch 196, 200 will close a circuit to the door switch circuit so that the light bulbs 140a, 140b are illuminated when a corresponding vehicle door is opened.

Each of the electrical components, i.e. power plug 180, switches 196, 200, and bulb holders 140, are directly wired with each other as described above, without intermediate or inline connectors. Such intermediate connectors are well known in prior mirror assemblies. The elimination of such intermediate connectors in the present mirror assembly 30 eliminates a major potential for open connectors and provides a significantly more durable and reliable wiring system for the mirror assembly.

Each switch 196, 200 is also snap fit into case 32 (FIGS. 7, 8 and 11). Switch receptacles 216 and 218 are provided in case 32 and positioned one on either side of actuator 44, for receiving and holding each switch 196, 200, respectively (FIG. 8). Pairs of flanges 220 define channels 222 into which mounting tabs 224 on each switch 196, 200 are inserted (FIGS. 8 and 11). Further, a wedge portion 226 is provided on a bottom side of each switch 196, 200 and cooperates with a wedge shaped hook 228, projecting from side wall bottom portion 84. As either switch 196, 200 is inserted into its receptacle 216, 218, respectively, wedge 226 ramps over hook 228, temporarily displacing hook 228 until wedge 226 has passed hook 228 and hook 228 returns to its normal position to capture wedge 226 and lock the switch 196, 200 in place in case 32.

As will now be apparent, the assembly of case 32, lenses 104, 106, bulbs 140, reflectors 136, 138, the wire harness, bulb holders 142, switches 196, 200, and power plug 180 are all integrated together thereby eliminating the necessity of separate light modules and reducing the overall number of parts in the mirror.

The above description is considered that of the preferred embodiment only. Modifications of the invention will occur to those skilled in the art and to those who make or use the invention. Therefore, it is understood that the embodiment shown in the drawings and described above is merely for illustrative purposes and is not intended to limit the scope of the invention, which is defined by the following claims as interpreted according to the principles of patent law.

The embodiments of the invention in which an exclusive property or privilege is claimed are defined as follows:

1. A rearview mirror assembly for vehicles comprising:
   a case having a back wall and a perimeter sidewall thereabout defining an interior space within said case, said sidewall having a bottom portion, said bottom portion having an opening therethrough to an exterior of said case;
   a mirror element within said case, said mirror element being spaced from said back wall;
   an interior wall in said interior space defining a compartment within said case, said interior wall having a terminal edge, said interior wall extending from said back wall to said terminal edge toward said mirror element, said compartment opening toward said mirror element, said opening in said bottom portion of said sidewall extending from said compartment to the exterior of said case;
   a lamp located in said compartment providing light, said opening in said bottom portion of said sidewall transmitting light from said lamp to the exterior of said case;
   a lens positioned in said opening directing light from said lamp out of said compartment and case;
   sealing means between said mirror element and said interior wall for engaging said terminal edge of said interior wall and preventing escape of uncontrolled, stray light from said compartment, said sealing means including a resilient seal;
   said case including a bezel, said bezel engaging said mirror element in said case and causing said resilient seal to engage said terminal edge of said interior wall to prevent passage of light between said resilient seal and said terminal edge.

2. The assembly defined in claim 1 wherein said sealing means is a resilient foam material.

3. The assembly defined in claim 1 wherein said mirror element has a generally planar back surface facing said back wall and said sealing means is a layer of resilient foam material covering said back surface.

4. The assembly defined in claim 3 wherein:
   said resilient foam material has an adhesive layer whereby said foam material is attached to said back surface;
   said adhesive layer is supported on said foam material by a substrate; and
   said substrate forms a safety antiscatter layer when adhered to said back surface.

5. The assembly defined in claim 4 further including a vent conduit providing an air passageway between the exterior of said case and said compartment, said vent conduit being generally opposite to said bottom portion of said case sidewall.

6. The assembly defined in claim 5 wherein said lens has a perimeter edge, said opening in said bottom portion has a perimeter edge, and said lens perimeter edge is spaced from said opening perimeter edge, defining a ventilation passage from the exterior of said case to said compartment, whereby air can pass through said ventilation passage, through said compartment, and through said vent conduit to cool said lamp.

7. The assembly defined in claim 6 wherein:

said opening through said case sidewall defines a reference plane;

said lamp includes a light bulb and a reflector positioned opposite said bulb from said opening in said bottom portion; and said reflector is oriented to reflect light at an acute angle to said reference plane.

8. The assembly defined in claim 6 wherein said lamp includes a light bulb and a reflector positioned opposite said bulb from said opening in said bottom portion and said reflector is a curved member with a changing radius of curvature along at least one axis.

9. The assembly defined in claim 1 further including a vent conduit providing an air passageway between the exterior of said case and said compartment, said vent conduit being generally opposite to said bottom portion of said case sidewall.

10. The assembly defined in claim 1 wherein said lens has a perimeter edge, said opening in said bottom portion has a perimeter edge, and said lens perimeter edge is spaced from said opening perimeter edge, defining a ventilation passage therebetween, extending from the exterior of said case to said compartment.

11. The assembly defined in claim 1 wherein:

said lamp includes a light bulb and a reflector positioned opposite said bulb from said opening in said bottom portion;

said opening in said bottom portion defines a reference plane; and said reflector is oriented to reflect light at an acute angle to said reference plane.

12. The assembly defined in claim 1 wherein said lamp includes a light bulb and a reflector positioned opposite said bulb from said opening in said bottom portion and wherein said reflector is a curved member with a changing radius of curvature along at least one axis.

13. The assembly defined in claim 1 wherein:

said case back wall generally defines a reference plane;

said lens is generally planar and has a top surface facing toward said interior space of said case; and said top surface has a series of generally parallel grooves and ridges thereon so that said lens directs light transmitted through said lens away from said reference plane.

14. The assembly defined in claim 1 further including an electrical circuit for supplying power to said lamp, said circuit having a power plug, said case including a mounting aperture corresponding to said power plug, and said power plug being located in said mounting aperture and connected with said case.

15. A rearview mirror assembly for vehicles comprising:

a case having a back wall and a perimeter sidewall thereabout defining an interior space within said case, said sidewall having a bottom portion, said bottom portion having an opening therethrough to an exterior of said case; a mirror element within said case, said mirror element being spaced from said back wall and having a generally planar back surface;

an interior wall in said interior space defining a compartment within said case, said interior wall having a terminal edge spaced from said back wall, said interior wall extending away from said back wall to said terminal edge toward said mirror element, said opening in said bottom portion of said sidewall extending from said compartment to the exterior of said case;

a lamp located in said compartment providing light;

a lens positioned in said opening to direct light from said lamp out of said compartment and case;

sealing means between said mirror element and said interior wall for engaging said terminal edge of said interior wall and preventing escape of uncontrolled, stray light from said compartment, said sealing means being a layer of resilient foam material generally covering said back surface of said mirror element, said resilient foam material having an adhesive layer whereby said foam material is attached to said back surface of said mirror element, said adhesive layer being supported on said foam material by a substrate, said substrate forming a safety anti-scatter layer when adhered to said back surface;

a vent conduit providing an air passageway between the exterior of said case and said compartment, said vent conduit being generally opposite to said bottom portion of said case sidewall and including a light baffle which blocks light from projecting from said compartment.

16. A rearview mirror assembly for vehicles comprising:

a case having a back wall and a perimeter sidewall thereabout defining an interior space within said case, said sidewall having a bottom portion, said bottom portion having an opening therethrough to an exterior of said case; a mirror element within said case, said mirror element being spaced from said back wall and having a generally planar back surface;

an interior wall in said interior space defining a compartment within said case, said interior wall having a terminal edge spaced from said back wall, said interior wall extending away from said back wall to said terminal edge toward said mirror element, said opening in said bottom portion of said sidewall extending from said compartment to the exterior of said case;

a lamp located in said compartment providing light;

a lens positioned in said opening and directing light from said lamp out of said compartment and case;

sealing means between said mirror element and said interior wall for engaging said terminal edge of said interior wall and preventing escape of uncontrolled, stray light from said compartment, said sealing means being a layer of resilient foam material generally covering said back surface of said mirror element, said resilient foam material having an adhesive layer whereby said foam material is attached to said back surface of said mirror element, said adhesive layer being supported on said foam material by a substrate, said substrate forming a safety anti-scatter layer when adhered to said back surface;

a vent conduit providing an air passageway between the exterior of said case and said compartment, said vent conduit being generally opposite to said bottom portion of said case sidewall;

said lens having a perimeter edge, said opening having a perimeter edge, and said lens perimeter edge being spaced from said opening perimeter edge, defining a ventilation passage from the exterior of said case to said compartment, whereby air can pass through said ventilation passage, through said compartment, and through said vent conduit to cool said lamp; said lamp including a light bulb and a reflector positioned opposite said bulb from said opening, said reflector being a curved member with a changing radius of curvature along at least one axis, said reflector having a front edge positioned away from said back wall of said case and a back edge positioned near said back wall and wherein said radius of curvature progressively lengthens from said front edge to said back edge.

17. The assembly defined in claim 16 wherein:

said case back wall generally defines a reference plane;

said lens is generally planar and has a top surface facing toward said interior space of said case; and said lens top surface having a series of generally parallel grooves and ridges thereon so that said lens directs light transmitted through said lens away from said back wall reference plane.

18. The assembly defined in claim 17 wherein said grooves and ridges define a series of generally parallel and planar surfaces facing generally away from said case back wall and a series of generally parallel and curved surfaces facing generally toward said case back wall.

19. The assembly defined in claim 18 wherein one of said ridges projects above an adjacent groove by at least twice as far as the remaining ridges project above another adjacent groove.

20. The assembly defined in claim 17 further including an electrical circuit for supplying power to said lamp, said circuit having a power plug, said case including a mounting aperture corresponding to said power plug, and said power plug being located in said mounting aperture and connected with said case.

21. The assembly defined in claim 20 wherein:

said electrical circuit further includes bulb holder means for holding said light bulb;

said case has a plurality of receptacles for receiving said bulb holder means and a plurality of mounting posts for receiving said reflector;

said bulb holder means is located in said receptacles; and said reflector is mounted on said posts.

22. The assembly defined in claim 21 wherein:

said electrical circuit further includes a control switch;

said case has flanges defining channels configured for receiving said switch; and said switch is located in said channels.

23. The assembly of claim 17 wherein said lens has a bottom surface including a series of Fresnel lens elements oriented at an angle other than 90° to said grooves and ridges on said top surface.

24. A rearview mirror assembly for vehicles comprising:

a case having a back wall and a perimeter sidewall thereabout defining an interior space within said case, said sidewall having a bottom portion, said bottom portion having an opening therethrough to an exterior of said case; a mirror element within said case, said mirror element being spaced from said back wall;

an interior wall in said interior space defining a compartment within said case, said interior wall having a terminal edge spaced from said back wall, said interior wall extending away from said back wall to said terminal edge toward said mirror element, said opening in said bottom portion of said sidewall extending from said compartment to the exterior of said case;

a lamp located in said compartment providing light;

a lens positioned in said opening and directing light from said lamp out of said compartment and case;

sealing means between said mirror element and said interior wall for engaging said terminal edge of said interior wall and preventing escape of uncontrolled, stray light from said compartment;

a vent conduit providing an air passageway between the exterior of said case and said compartment, said vent conduit being generally opposite to said bottom portion of said case sidewall, and including a light baffle which blocks light from projecting from said compartment.

25. A rearview mirror assembly for vehicles comprising:

a case having a back wall and a perimeter sidewall thereabout defining an interior space within said case, said sidewall having a bottom portion, said bottom portion having an opening therethrough to an exterior of said case; a mirror element within said case, said mirror element being spaced from said back wall;

an interior wall in said interior space defining a compartment within said case, said interior wall having a terminal edge spaced from said back wall, said interior wall extending away from said back wall to said terminal edge toward said mirror element, said opening in said bottom portion of said sidewall extending from said compartment to the exterior of said case;

a lamp located in said compartment providing light;

a lens positioned in said opening and directing light from said lamp out of said compartment and case; and sealing means between said mirror element and said interior wall for engaging said terminal edge of said interior wall and preventing escape of uncontrolled, stray light from said compartment;

said case back wall generally defining a reference plane;

said lens being generally planar and having a top surface facing toward said interior space of said case; and said top surface having a series of generally parallel grooves and ridges thereon so that said lens generally directs light transmitted through said lens away from said reference plane, one of said ridges projecting above an adjacent groove by at least twice as far as the remaining ridges project above another adjacent groove.

26. A rearview mirror assembly for vehicles comprising:

a case having a back wall, a perimeter sidewall thereabout defining an interior space within said case, and a lip configured to retain a mirror element in said case, said sidewall having a bottom portion, said bottom portion having an opening therethrough to an exterior of said case;

a mirror element within said case, said mirror element being spaced from said back wall;

an interior wall having a terminal edge spaced from said back wall and located in said interior space, and said interior wall extending from said back wall to said terminal edge and defining a compartment within said case, said compartment opening toward said mirror element, said opening in said bottom portion of said sidewall extending from said compartment to the exterior of said case and transmitting light from a lamp when mounted in said compartment to the exterior of said case;

sealing means located between said mirror element and said terminal edge of said interior wall for sealing between said mirror element and said terminal edge, said sealing means including a resilient seal engaging said terminal edge of said interior wall to close said compartment, said lip engaging said mirror element in said case and causing said resilient seal to engage said terminal edge of said interior wall to prevent passage of light from the lamp between said resilient seal and said terminal edge when the lamp is mounted in said compartment.

27. The assembly defined in claim 26 wherein said sealing means is a resilient foam material.

28. The assembly defined in claim 26 wherein said mirror element has a generally planar back surface facing said back wall and said sealing means is a layer of resilient foam material covering said back surface.

29. The assembly defined in claim 28 wherein:

said resilient foam material has an adhesive layer whereby said foam material is attached to said back surface;

said adhesive layer is supported on said foam material by a substrate; and said substrate forms a safety antiscatter layer when adhered to said back surface.

30. The assembly defined in claim 29 further including a vent conduit providing an air passageway between the exterior of said case and said compartment, said vent conduit being generally opposite to said bottom portion of said case sidewall.

31. The assembly defined in claim 30 including a lens positioned in said opening and directing light from a lamp out of said compartment when the lamp is mounted in said compartment; said lens having a perimeter edge, said opening having a perimeter edge, and said lens perimeter edge being spaced from said opening perimeter edge, defining a ventilation passage from the exterior of said case to said compartment, whereby air can pass through said ventilation passage, through said compartment, and through said vent conduit to cool the lamp when mounted in said compartment.

32. The assembly defined in claim 26 including a lens positioned in said opening and directing light from a lamp out of said compartment when the lamp is mounted in said compartment, said lens having a perimeter edge, said opening having a perimeter edge, and said lens perimeter edge being spaced from said opening perimeter edge and defining a ventilation passage from the exterior of said case to said compartment.

33. A rearview mirror assembly for vehicles comprising:

a case having a back wall and a perimeter sidewall thereabout defining an interior space within said case, said sidewall having a bottom portion, said bottom portion having an opening therethrough to an exterior of said case; a mirror element within said case, said mirror element having a generally planar back surface and being spaced from said back wall an interior wall having a terminal edge spaced from said back wall and located in said interior space, said interior wall extending from said back wall to said terminal edge toward said mirror element and defining a compartment within said case, said opening in said bottom portion of said sidewall extending from said compartment to the exterior of said case and transmitting light from a lamp when mounted in said compartment to the exterior of said case;

sealing means located between said mirror element and said case for sealing between said mirror element and said case, said sealing means engaging said terminal edge of said interior wall to prevent passage of light between said sealing means and said terminal edge and including a layer of resilient foam material generally covering said back surface of said mirror element, said resilient foam material including an adhesive layer whereby said foam material is attached to said back surface of said mirror element, said adhesive layer being supported on said foam material by a substrate, said substrate forming a safety anti-scatter layer when adhered to said back surface of said mirror element; and a vent conduit providing an air passageway between the exterior of said case and said compartment, said vent conduit being generally opposite to said bottom portion of said case sidewall, and including a light baffle which blocks light from projecting from said compartment.

34. A rearview mirror assembly for vehicles comprising:

a case having a back wall and a perimeter sidewall thereabout defining an interior space within said case, said sidewall having a bottom portion, said bottom portion having an opening therethrough to an exterior of said case; a mirror element within said case, said mirror element being spaced from said back wall;

an interior wall having a terminal edge spaced from said back wall and located in said interior space, said interior wall extending from said back wall to said terminal edge toward said mirror element and defining a compartment within said case, said opening in said bottom portion of said sidewall extending from said compartment to the exterior of said case and transmitting light from a lamp when mounted in said compartment to the exterior of said case;

sealing means located between said mirror element and said case for sealing between said mirror element and said case, said sealing means engaging said terminal edge of said interior wall to prevent passage of light between said sealing means and said terminal edge; and a vent conduit providing an air passageway between the exterior of said case and said compartment, said vent conduit being generally opposite to said bottom portion of said case sidewall and including a light baffle which blocks light from projecting from said compartment.

35. A rearview mirror assembly for vehicles comprising:

a case having a back wall and a perimeter sidewall thereabout defining an interior space within said case, said sidewall having a bottom portion, said bottom portion having an opening therethrough to an exterior of said case;

a mirror element within said case, said mirror element having front and rear surfaces and being spaced from said back wall;

an interior wall in said interior space, said interior wall including a terminal edge, said interior wall extending from said back wall to said terminal edge toward said mirror element and defining a compartment within said case, said compartment opening toward said mirror element; said opening in said bottom portion of said sidewall extending from said compartment to the exterior of said case;

a resilient sealing layer disposed between said rear surface of said mirror element and said terminal edge;

a lamp located in said compartment;

said interior wall cooperating with said resilient sealing layer and preventing escape of light from said lamp in said compartment except through said opening, said resilient sealing layer engaging said terminal edge of said interior wall to prevent passage of light between said sealing layer and said terminal edge; and a lens positioned in said opening of said bottom portion, said lens directing light downward out of said case through said opening of said bottom portion.

36. The assembly defined in claim 35 wherein:

said case back wall generally defines a reference plane;

said lens is generally planar and has a top surface facing toward said interior space of said case; and said lens top surface has a series of generally parallel grooves and ridges thereon so that said lens directs light transmitted through said lens away from said reference plane.

37. A rearview mirror assembly for vehicles comprising:

a case having a back wall and a perimeter sidewall thereabout defining an interior space within said case, said sidewall having a bottom portion, said bottom portion having an opening therethrough to an exterior of said case;

a mirror element within said case, said mirror element being spaced from said back wall;

an interior wall in said interior space, said interior wall including a terminal edge, said interior wall extending from said back wall to said terminal edge toward said mirror element and defining a compartment within said case, said opening in said bottom portion of said sidewall extending from said compartment to the exterior of said case;

a lamp located in said compartment;

said interior wall cooperating with said mirror element preventing escape of light from said lamp in said compartment except through said opening; and a lens positioned in said opening, said lens directing light downward out of said case through said opening and away from said case back wall;

said case back wall generally defining a reference plane;

said lens being generally planar and having a top surface facing toward said interior space of said case, said lens top surface having a series of generally parallel grooves and ridges thereon so that said lens directs light transmitted through said lens away from said reference plane, each of said ridges having a generally planar surface facing generally away from said case back wall and a curved surface facing generally toward said case back wall.

38. The assembly defined in claim 37 wherein one of said ridges projects above an adjacent groove by at least twice as far as the remaining ridges project above another adjacent groove.

39. The assembly defined in claim 38 wherein said mirror element includes sealing means including a resilient seal between said mirror element and said terminal edge of said interior wall said resilient seal engaging said terminal edge to prevent passage of light between said resilient seal and said terminal edge.

40. A rearview mirror assembly for vehicles comprising:

a case having a back wall and a perimeter sidewall thereabout defining an interior space within said case, said sidewall having a bottom portion, said bottom portion having an opening therethrough to an exterior of said case;

a mirror element within said case, said mirror element being spaced from said back wall;

an interior wall in said interior space, said interior wall including a terminal edge, said interior wall extending from said back wall to said terminal edge toward said mirror element and defining a compartment within said case, said opening in said bottom portion of said sidewall extending from said compartment to the exterior of said case;

a lamp located in said compartment;

said interior wall cooperating with said mirror element and preventing escape of light from said lamp in said compartment except through said opening; and a lens positioned in said opening, said lens directing light downward out of said case through said opening and away from said case back wall;

said case back wall generally defining a reference plane;

said lens being generally planar and having a top surface facing toward said interior space of said case, said lens top surface having a series of generally parallel grooves and ridges thereon so that said lens directs light transmitted through said lens away from said reference plane, said lens having a bottom surface including a series of Fresnel lens elements oriented at an angle other than 90° to said grooves and ridges on said top surface.

41. The assembly of claim 40 wherein said Fresnel lens elements are arranged in a V-shaped pattern.

* * * * *

UNITED STATES PATENT AND TRADEMARK OFFICE
CERTIFICATE OF CORRECTION

PATENT NO.    : 5,649,756
DATED         : July 22, 1997
INVENTOR(S)   : Adams et al.

It is certified that error appears in the above-identified patent and that said Letters Patent is hereby corrected as shown below:

Column 1,
Line 8, after "abandoned" insert -- , --.

Column 2,
Line 6, after "embodiment" insert -- , --.
Line 45, "cases" should -- case --.

Column 11,
Line 67, "a mirror" should begin a new paragraph.

Column 12,
Line 36, "a mirror" should begin a new paragraph.

Column 13,
Line 32, "claim 17" should be -- claim 1 --.
Line 61, "a mirror" should begin a new paragraph.

Column 14,
Line 21, "a mirror" should begin a new paragraph.
Line 59, "space, and said" should be -- space, said --.

Column 15,
Line 54, "a mirror" should begin a new paragraph.
Line 56, after "wall" insert -- ; --.

Column 16,
Line 23, "a mirror" should begin a new paragraph.

Column 17,
Line 35, "preventing" should be -- to prevent --.

UNITED STATES PATENT AND TRADEMARK OFFICE
CERTIFICATE OF CORRECTION

PATENT NO.    : 5,649,756
DATED         : July 22, 1997
INVENTOR(S)   : Adams et al.

It is certified that error appears in the above-identified patent and that said Letters Patent is hereby corrected as shown below:

Column 18,
Line 8, "wall said" should be -- wall, said --.

Signed and Sealed this

Fourth Day of February, 2003

JAMES E. ROGAN
*Director of the United States Patent and Trademark Office*